United States Patent [19]

Screen

[11] Patent Number: 4,706,329
[45] Date of Patent: Nov. 17, 1987

[54] TWIN-WHEEL CASTOR

[75] Inventor: Stafford T. Screen, Stourbridge, England

[73] Assignee: Colson Castors (U.K.), West Bromich, England

[21] Appl. No.: 773,382

[22] Filed: Sep. 6, 1985

[30] Foreign Application Priority Data

Sep. 7, 1984 [GB] United Kingdom ............... 8422660

[51] Int. Cl.$^4$ ............................................. B60B 33/00
[52] U.S. Cl. ...................................................... 16/47
[58] Field of Search .......................... 16/47, 45, 46, 48

[56] References Cited

U.S. PATENT DOCUMENTS

| 285,491 | 9/1883 | Keller | 16/47 |
| 1,153,838 | 9/1915 | Bower | 16/46 |
| 3,894,310 | 7/1975 | Screen | 16/47 |
| 4,067,083 | 1/1978 | Greene | 16/45 |
| 4,404,707 | 9/1983 | Walker | 16/46 |

FOREIGN PATENT DOCUMENTS

| 2803169 | 7/1979 | Fed. Rep. of Germany . | |
| 2927549 | 1/1981 | Fed. Rep. of Germany | 16/47 |
| 3319142 | 12/1983 | Fed. Rep. of Germany . | |
| 2089654 | 6/1982 | United Kingdom | 16/47 |

Primary Examiner—Gene P. Crosby
Attorney, Agent, or Firm—Neuman, Williams, Anderson & Olson

[57] ABSTRACT

A castor comprises a moulded plastics body (1) having a socket for a swivel pin and a center wall (6) with an aperture of which the edge is formed as the outer ball track (9) of a ball bearing. Two moulded plastics wheels (2) have hollow hub portions (11) extending towards the center wall and shaped to co-operate to provide the inner ball track (17) of the ball bearing.

13 Claims, 3 Drawing Figures

TWIN-WHEEL CASTOR

BACKGROUND OF THE INVENTION

The invention relates to a twin-wheel castor.

A variety of twin-wheel castor structures exist, but these in general fall short of optimum requirements in respect for example of utilisation of materials and simplicity of assembly.

It is accordingly an object of the invention to provide a castor comprising a small number of parts, which can be readily assembled together.

It is also an object of the invention to provide a castor which makes economical use of conveniently available materials.

It is a further object of the invention to provide a castor in which utilisation of movable bearing parts is minimized.

It is an additional object of the present invention to provide a castor including ball bearing means in which the ball bearing races are integrally formed portions of the castor.

The present invention provides a castor comprising a body journalling a pair of wheels for rotation about a common axis and having means whereby the castors can be mounted on an article of furniture or the like for swivelling about a substantially vertical axis, the wheels being journalled on the body by a single common ball bearing.

Conveniently, the body provides an apertured wheel mounting portion between the wheels, the edges of the aperture being shaped to constitute an outer race for the ball bearing. Each wheel has an inwardly projecting hub portion, the two hub portions being secured together by fastener means so as to permit differential wheel rotation and being shaped so that they together form the inner race of the ball bearing.

A twin-wheel castor embodying the invention can comprise a body and wheels of plastics material, only a swivel pin for mounting the body on an article of furniture or the like, the balls of the ball bearing and retaining means holding the wheels in engagement with the balls of the bearing being of metal.

Thus a twin-wheel castor is provided in accordance with the invention which is of simple construction, and formed mainly of readily mouldable plastics components, metal components being employed only where necessary.

Referring to the accompanying drawings, there is shown a castor comprising a body 1, conveniently integrally moulded from plastics material, on which a pair of like wheels 2 are mounted for independent rotation about a common, substantially horizontal, axis.

Figure 1:
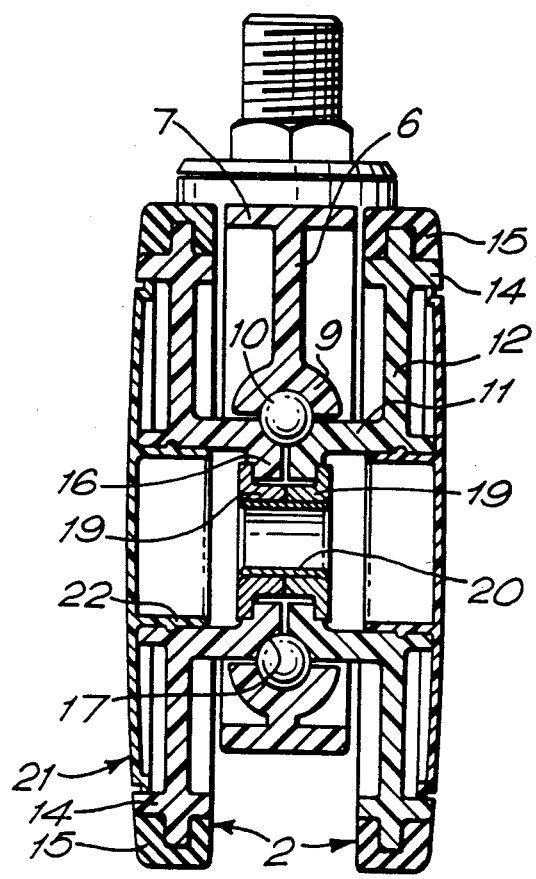
FIG. 1 is sectional rear view of a castor embodying the invention taken on the line I—I of FIG. 2.
Figure 2:
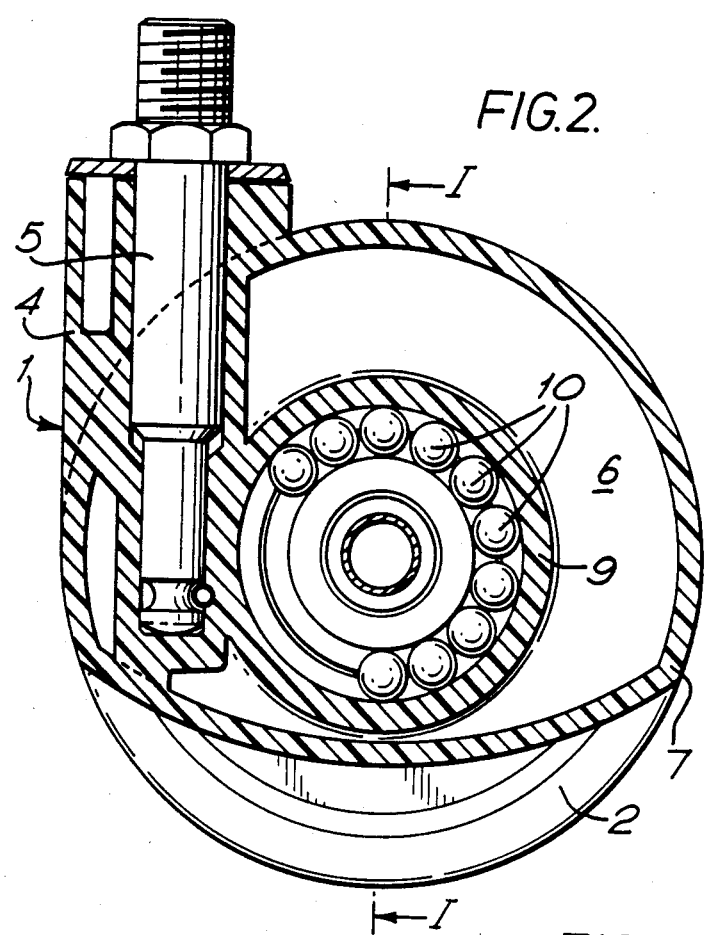
FIG. 2 is sectional side view of the castor of FIG. 1.
Figure 3:
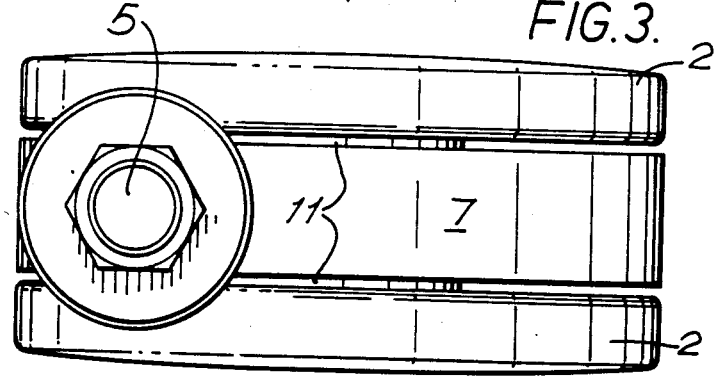
FIG. 3 is a plan view of the castor.

The forward portion 4 of the body in use provides a cylindrical upright socket, shaped to receive a swivel pin 5, for example of steel, by which the castor is mounted in a conventional way on a furniture item or the like which the castor is to support, for swivelling about a substantially vertical axis spaced from the wheel axis. The body 1 also has a generally vertical partition or web portion 6 extending rearwardly from the forward portion 4. As appears from FIG. 1, the upper edge of the web portion 6 is generally circular in shape over substantially more than half its extent, but below, it is bounded by an arcuate portion of much greater radius.

Extending laterally from either side of the outer periphery of the web portion 5 is a cylindrical rim or flange 7 which is continuous, except where interrupted by the forward portion 4 of the body. The upper part of the flange 7 has a radius externally corresponding to the external radius of the wheels 2, and an extent axially of the wheels such as to be only slightly spaced from them. The web portion 6 also includes a circular aperture centered on the upper part of the web portion periphery and which adjoins the flange 7 at the lower part. The aperture is formed as an inwardly opening rounded channel 9 and constitutes an outer race or track for balls 10, for example of steel, of a ball bearing. A cage of like spacing means (not shown) can be provided between adjacent balls 10 of the ball bearing.

The inner ball race for the balls 10 is defined by hollow cylindrical hub portions 11 of the wheels 2, each of which can be integrally moulded of plastics material. Each wheel 2 comprises an annular disc 12 with inwardly and outwardly extending shallow cylindrical flanges 14 spaced from its outer edge, to provide a seating for a tyre 15, for example a rubber tyre. From the inner periphery of the discs 12, the cylindrical hubs 11 extend axially inwardly to inwardly extending annular flanges 16 which oppose one another across the median plane of the web portion 6 of the body 1. At the external corners between the hub and flanges 16, the wheels are grooved so as to form together a generally semi-circular groove 17 which constitutes an inner ball race or track for the balls 10.

The hub protions 11 of the wheels 2 are held in engagement with the balls 10, so that rotational axes of the wheels are maintained in alignment, and so that the wheels can rotate independently, by suitable fastener or connecting means, here in the form of two connected spacer bushes 19, for example of steel. Each bush 19 comprises a sleeve portion received in an associated one of the annular flanges 16, with an out-turned flange portion at its outer end, the flange portion being received in a rectangular groove formed at the outer corner of the associated flange 16. The two bushes 19 are secured together by a rivet 20.

Each of the wheels 2 has a cover plate 21 of plastics material with inwardly projecting sleeve portion 22 shaped to make a snap fit within the hollow hub portion 11 of the wheel. At its outer periphery, each cover plate 21 abuts the inner side of the outwardly projecting flange 14 of the wheel.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A castor comprising:
   a body,
   means for mounting said body on an article to be supported for swivelling movement of said body relative to the article about a substantially vertical axis.

a circular aperture in said body of which the edge is shaped to function as a ball race.

two wheels each having a hub portion, each of said hub portions comprising an end wall, and an aperture formed in said end wall, fastener means rotatably connecting said wheels together with said hub portions in adjacency, means comprising a spacer bush received in each of said hub portion and wall apertures, and connecting means connecting together said spacer bushes in abutting relationship with said hub portion end walls spaced slightly apart, formations at the adjacent ends of said hub portions, said formations cooperating to define a ball race opposed to said body ball race, and bearing balls received between said ball races to rotatably mount said wheels to said body.

2. The castor of claim 1 wherein said connecting means comprises a rivet.

3. The castor of claim 1 wherein said hub portions are hollow, and wherein each of said wheels further comprises an outer cover, said outer covers having securement means projecting inwardly for reception within said hubs to thereby secure said covers in place.

4. The castor of claim 3 wherein said hollow hub interiors are adapted to receive said outer cover securement means as a snap-fit connection.

5. A castor comprising:

a body, means whereby said body can be assembled with an article to be supported by the castor for relative swivelling movement of said article and said body about a substantially vertical axis, a pair of wheels, a wall portion of said body extending between said wheels for mounting said wheels thereon, an aperture in said wall portion, an outer ball track formed around said wall portion aperture, a hub portion on each of said wheels, means connecting together said hub portions to maintain the axis of said wheels in alignment and to permit independent rotation of said wheels, an inner ball track formed on each of said hub portions for cooperation with said outer ball track, and ball bearings received between said inner and outer ball tracks to thereby mount said wheels on said body for rotation about a common substantially horizontal axis spaced from said substantially vertical axis, said hub portions being hollow cylindrical hub portions having closely adjacent inwardly extending flanges at the inner ends thereof, said connecting means connecting together said hub portions by engagement with said inwardly extending flanges.

6. The castor of claim 5 wherein said connecting means comprises bushings engaging said flanges and a rivet connecting said bushings.

7. The castor of claim 5 further comprising outer covers for said wheels, said outer covers closing the interiors of said hollow cylindrical hub portions.

8. The castor of claim 7 further comprising snap-fit securement means operative between said outer covers and said interiors of said hollow cylindrical hub portions.

9. The castor of claim 7 wherein said outer covers extend radially outwardly beyond said hub portions.

10. A castor comprising:

a body, said body comprising a molded plastics component, mounting means whereby said body can be mounted to an article to be supported by the castor for relative swivelling movement of said body and said article about a substantially vertical axis, a wall portion of said body, an aperture through said wall portion, an outer ball track extending around said body wall portion aperture, two castor wheels, each of said wheels comprising a molded plastics component, means connecting together said castor wheels in axial alignment, a hub portion on each of said castor wheels, an inner ball track portion formed on each of said hub portions, said inner ball track portions together forming an inner ball track cooperating with said outer ball track and said connecting means being confined axially to substantially the axial extent of said inner and outer ball tracks, and a plurality of ball bearings received between said inner and outer ball tracks to thereby mount said wheels symmetrically on opposed sides of said wall portion for rotation about a common substantially horizontal axis spaced from said substantially vertical axis.

11. The castor of claim 10 wherein said outer ball track of said body wall and said inner ball track portions of said hub portions are integrally molded with said body wall and said hub portions, respectively.

12. The castor of claim 10 wherein said hub portions have adjacent end wall portions, aligned apertures are formed in said end wall portions and said connecting means comprises a rivet received in said apertures.

13. The castor of claim 12 wherein only said plurality of ball bearings and said rivet are of metal.

* * * * *